(12) United States Patent
Jiang et al.

(10) Patent No.: US 10,061,389 B2
(45) Date of Patent: Aug. 28, 2018

(54) GESTURE RECOGNITION SYSTEM AND GESTURE RECOGNITION METHOD

(71) Applicant: Beijing TransBorder Information Technology Co., Ltd., Beijing (CN)

(72) Inventors: Xiaodan Jiang, Beijing (CN); Qin Liu, Beijing (CN); Yongzhen He, Beijing (CN)

(73) Assignee: BEIJING TRANSBORDER INFORMATION TECHNOLOGY CO., LTD. (CN)

( * ) Notice: Subject to any disclaimer, the term of this patent is extended or adjusted under 35 U.S.C. 154(b) by 392 days.

(21) Appl. No.: 14/728,113

(22) Filed: Jun. 2, 2015

(65) Prior Publication Data

US 2015/0346833 A1     Dec. 3, 2015

(30) Foreign Application Priority Data

Jun. 3, 2014   (CN) .......................... 2014 1 0241519
Jun. 3, 2014   (CN) .......................... 2014 1 0241618

(51) Int. Cl.
*G06F 3/01*     (2006.01)
*G06K 9/00*     (2006.01)

(52) U.S. Cl.
CPC .............. *G06F 3/017* (2013.01); *G06F 3/014* (2013.01); *G06F 3/015* (2013.01)

(58) Field of Classification Search
CPC ........... G06F 3/017; G06F 3/014; G06F 3/015
See application file for complete search history.

(56) References Cited

U.S. PATENT DOCUMENTS

| | | | | |
|---|---|---|---|---|
| 7,539,532 B2* | 5/2009 | Tran | ................. | A61B 5/021 600/509 |
| 9,219,975 B2* | 12/2015 | Holman | ................. | H04W 4/005 |
| 9,477,313 B2* | 10/2016 | Mistry | ................. | G06F 3/014 |
| 2007/0091063 A1* | 4/2007 | Nakamura | ............ | G06F 3/016 345/156 |
| 2009/0318779 A1* | 12/2009 | Tran | ................. | A61B 5/0022 600/301 |
| 2010/0029327 A1* | 2/2010 | Jee | ................. | G04G 17/045 455/556.1 |
| 2010/0124949 A1* | 5/2010 | Demuynck | ......... | G06F 1/1626 455/569.1 |
| 2013/0197680 A1* | 8/2013 | Cobbett | ................. | G06F 1/163 700/91 |

(Continued)

*Primary Examiner* — Afroza Chowdhury
(74) *Attorney, Agent, or Firm* — Flener IP & Business Law

(57) ABSTRACT

A gesture recognition system comprises: a signal collection terminal, configured to collect and preprocess gesture data of a gesture object; a local recognition device, configured to extract features from the gesture data received from the signal collection terminal, form a multi-dimensional feature vector based on extracted features, establish local gesture models based on the multi-dimensional feature vector and perform local gesture recognition according to the local gesture models; and a cloud server, configured to receive the multi-dimensional feature vector from the local recognition device when there is a network connection between the local recognition device and the cloud server, establish cloud gesture models based on the received multi-dimensional feature vector and perform cloud gesture recognition according to the cloud gesture models. A gesture recognition method is also disclosed.

18 Claims, 3 Drawing Sheets

(56) References Cited

U.S. PATENT DOCUMENTS

| | | | |
|---|---|---|---|
| 2013/0217978 A1* | 8/2013 | Ma | A61B 5/02438 600/301 |
| 2013/0231574 A1* | 9/2013 | Tran | A61B 5/0022 600/479 |
| 2014/0139454 A1* | 5/2014 | Mistry | G06F 3/041 345/173 |
| 2014/0143737 A1* | 5/2014 | Mistry | G06F 3/0488 715/854 |

* cited by examiner

GESTURE RECOGNITION SYSTEM AND GESTURE RECOGNITION METHOD

CROSS-REFERENCE TO RELATED APPLICATIONS

This application claims the benefit and priority of Chinese patent application No. 201410241519.9 filed on Jun. 3, 2014 and Chinese patent application No. 201410241618.7 filed on Jun. 3, 2014. Both of these applications are incorporated herein in their entirety by reference.

TECHNICAL FIELD

The disclosed embodiments relate to a gesture recognition system and a gesture recognition method.

BACKGROUND

Gesture is widely used in daily life of people as a common communication way. With rapid development of computer technology in recent years, research on gesture recognition to introduce gesture into man-machine interfaces has drawn great attraction and made great progresses.

However, although a variety of gesture recognition systems and methods have been proposed, the current gesture recognition systems and methods have many disadvantages such as no operation under the condition of no or poor network connection, low recognition accuracy or poor user experience. Thus, there is a demand to provide a gesture recognition system and method which is capable of ensuring instant operation and improving recognition accuracy.

SUMMARY

Embodiments of the present invention are directed to a gesture recognition system which is capable of ensuring instant operation and improving recognition accuracy.

Embodiments of the present invention are also directed to a gesture recognition method which is capable of ensuring instant operation and improving recognition accuracy.

According to embodiments of the present invention, a gesture recognition system comprises: a signal collection terminal, configured to collect and preprocess gesture data of a gesture object; a local recognition device, configured to extract features from the gesture data received from the signal collection terminal, form a multi-dimensional feature vector based on extracted features, establish local gesture models based on the multi-dimensional feature vector and perform local gesture recognition according to the local gesture models; and a cloud server, configured to receive the multi-dimensional feature vector from the local recognition device when there is a network connection between the local recognition device and the cloud server, establish cloud gesture models based on the received multi-dimensional feature vector and perform cloud gesture recognition according to the cloud gesture models.

The signal collection terminal may comprise: a collection module, configured to collect the gesture data of the gesture object; a preprocessing module, configured to perform noise deduction preprocessing for the gesture data; and a communication module, configured to transmit the preprocessed gesture data to the local recognition device.

The collection module may comprise a plurality of bioelectrical electrodes and a plurality of acceleration sensors. The gesture data may include bioelectrical signals sensed from the plurality of bioelectrical electrodes and space motion signals sensed from the plurality of acceleration sensors. The bioelectrical signals may include myoelectricity signals and skin impedance signals, the space motion signals may include motion acceleration signals and space rotation signals.

The communication module may transmit the preprocessed gesture data through Bluetooth protocol.

The preprocessing module may comprise a band-pass filter unit and/or a band-stop filter unit.

The local recognition device may comprise: a segmentation module, configured to receive the gesture data from the signal collection terminal, identify a beginning point and an ending point of each gesture so as to obtain independent gesture signal segments; a feature extraction module, configured to perform feature extraction for each gesture signal segment, and combine the feature data extracted from different gesture signal segments so as to obtain a multi-dimensional feature vector; a local data set module, configured to store the multi-dimensional feature vector and upload the multi-dimensional feature vector to the cloud server when there is a network connection between the local recognition module and the cloud server; a local classification model module, configured to establish local gesture models based on the multi-dimensional feature vector; and a local gesture recognition module, configured to perform real-time recognition for the multi-dimensional feature vector according to the local gesture models, so as to obtain a local gesture recognition result.

The local data set module may be further configured to delete the multi-dimensional feature vector after uploading the multi-dimensional feature vector to the cloud server.

The segmentation module may be configured to obtain gesture original signals by baseline detection, smooth filtering, zero crossing detection and calculation of area under a waveform curve for the preprocessed data, and normalize the obtained gesture original signals, convert absolute magnitudes of the gesture original signals to relative magnitudes between 0 and 1, compare the relative magnitudes with predetermined energy thresholds so as to identify the beginning point and the ending point of each gesture. The segmentation module may be further configured to update the energy thresholds with energy threshold sent from the cloud server.

The cloud server may comprise: a cloud data set module, configured to receive the multi-dimensional feature vectors uploaded from one or more local data set modules of one or more local recognition devices, and form a massive data set; a cloud classification model module, configured to establish cloud gesture models using the massive data set; and a cloud gesture recognition module, configured to perform recognition for the multi-dimensional feature vector received from the local recognition device according to the cloud gesture models, so as to obtain a cloud gesture recognition result.

The cloud classification model module may be further configured to transmit the cloud gesture models to the local data set module, and the local data set module may be further configured to update the local gesture models with the received cloud gesture models. The cloud classification model module may be further configured to cut the cloud gesture models before transmitting the cloud gesture models to the local data set module.

The local gesture recognition module may be further configured to receive the cloud gesture recognition result from the cloud gesture recognition module, and obtain a final gesture recognition result based on combination of the local gesture recognition result and the cloud gesture recognition result.

The signal collection terminal may be a wristband. The wristband may comprise two parallel annular members, the first annular member is continuous and is used as a reference electrode, while the second annular member includes a plurality of sensing units and a power supply unit. The plurality of sensing units may comprise a plurality of bioelectrical electrodes configured to sense bioelectrical signals at different positions on skin of a forearm and a plurality of acceleration sensor configured to sense space motion signals of a hand.

According to embodiments of the present invention, a gesture recognition method comprises: collecting and preprocessing gesture data of a gesture object; extracting features from the gesture data and forming a multi-dimensional feature vector based on extracted features; establishing local gesture models based on the multi-dimensional feature vector and performing local gesture recognition according to the local gesture models; and establishing cloud gesture models based on the multi-dimensional feature vector and performing cloud gesture recognition according to the cloud gesture models when there is a network connection.

The method may further comprise obtaining a final gesture recognition result based on result of the step of performing local gesture recognition, or based on combination of the result of the step of performing local gesture recognition and result of the step of performing cloud gesture recognition when there is the network connection.

The gesture data may include bioelectrical signals and space motion signals.

The method may further comprise updating the local gesture models with the cloud gesture models.

With the gesture recognition system and the gesture recognition method according to embodiments of the present invention, the local recognition device receives preprocessed data and performs feature extraction and combination, establishes local gesture models and performs real-time gesture recognition. Meanwhile, when there is a network connection between the local recognition device and the cloud server, the local recognition device transmits the gesture data after extraction and combination to the cloud server. The cloud server establishes cloud gesture models and performs gesture recognition. In addition, the cloud server updates the local gesture models with the cloud gesture models. Thus it could be seen there are both of "local recognition mode" and "cloud recognition mode" in the embodiments of the present invention. When the user is not capable of accessing the Internet due to various limitations, the local recognition device can perform real-time gesture recognition, thereby ensuring that the gesture recognition can be performed at any time and in any environment. And when the user is capable of accessing the Internet, the cloud server establishes cloud gesture models based on gesture data received from multiple local recognition devices and updates the local gesture models with the cloud gesture models, thereby improving accuracy of gesture recognition.

The signal collection terminal according to embodiments of the present invention may be formed as a wristband form, which has simple structure and great portability, so the signal collection terminal is easy to use. In addition, both of bioelectrical electrodes which are good at sensing fine actions of fingers and acceleration sensors which are good at sensing large-scale movement are provided, thus more actions can be sensed, the recognition accuracy of gestures is further improved. In addition, compared with video data, bioelectrical signals and space motion signals have less data size and need less network bandwidth, thus the signal collection terminal according to embodiments of the present invention has less size and less power consumption, and is easier to carry and use, which enhances the user experience.

In addition, the preprocessed data in the signal collection terminal may be transmitted to the local recognition device through a Bluetooth communication module, thereby providing convenient data transmission. Furthermore, after being transmitted to the cloud server, the local gesture data set may be deleted from the local recognition device to save local storage resource, which improves the performance of the gesture cognition system.

BRIEF DESCRIPTION OF DRAWINGS

These and other aspects will become apparent and more readily appreciated from the following description of the embodiments, taken in conjunction with the accompanying drawings in which.

DETAILED DESCRIPTION

Figure 1:
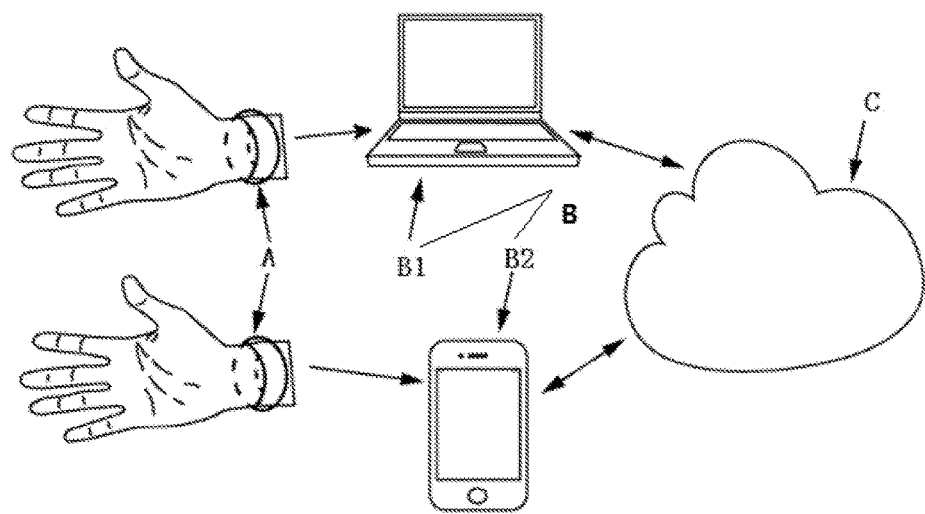
FIG. 1 is a schematic view illustrating a gesture recognition system according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
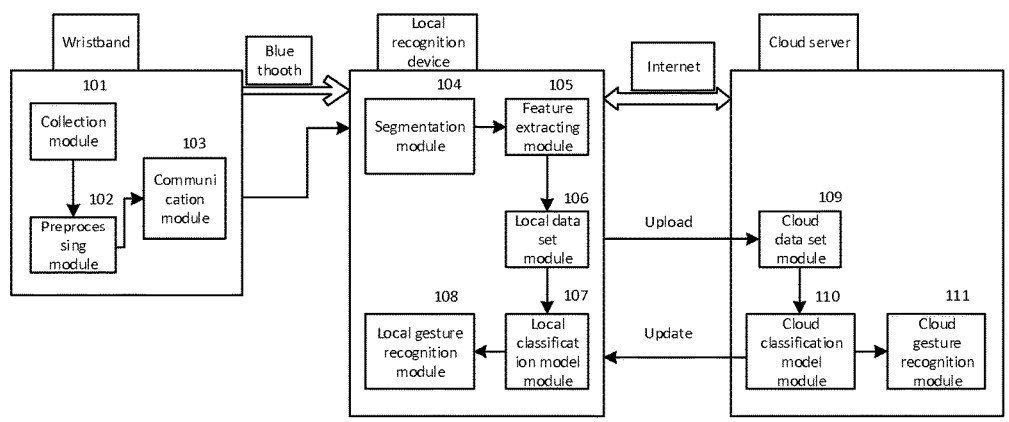
FIG. 2 is a block diagram illustrating detailed structure of the gesture recognition system shown in FIG. 1.

FIG. 1 is a schematic view illustrating a gesture recognition system according to an embodiment of the present invention, and FIG. 2 is a block diagram illustrating detailed structure of the gesture recognition system shown in FIG. 1.

As shown in FIG. 1, a gesture recognition system according to an embodiment of the present invention includes a signal collection terminal A, a local recognition device B and a cloud server C. The signal collection terminal A collects gesture data of a gesture object, and transmits the gesture data to the local recognition device B for further processing and recognition. The local recognition device B extracts features from the gesture data and forms a multi-dimensional feature vector based on the extracted features, transmits the multi-dimensional feature vector to the cloud server C when there is a network connection between the local recognition device B and the cloud server C, establishes local gesture models based on the multi-dimensional feature vector and performs local gesture recognition according to the local gesture models. The cloud server C establishes cloud gesture models based on the received multi-dimensional feature vector and performs cloud gesture recognition according to the cloud gesture models.

Further referring to FIG. 2, in an embodiment of the present invention, the signal collection terminal A includes a collection module 101, a preprocessing module 102 and a communication module 103. The collection module 101 collects gesture data, such as bioelectrical signals and space motion signals, of a gesture object via a plurality of sensing units disposed on the gesture object, and then transmits the bioelectrical signals and space motion signals to the preprocessing module 102. In an embodiment, the preprocessing module 102 includes a band-pass filter unit and/or a band-stop filter unit. After receiving the bioelectrical signals and the space motion signals from the collection module 101, the preprocessing module 102 performs noise reduction preprocessing for the signals and transmits preprocessed data to the local recognition device B via the communication module 103. In an embodiment, the communication module 103 is a Bluetooth wireless communication module which transmits the preprocessed data via Bluetooth protocol, but the present invention is not limited thereto, other wire or wireless communication means may be used as well.

The local recognition device B may be a computer B1 or a mobile phone B2 as shown in FIG. 1. As shown in FIG. 2, in an embodiment of the present invention, the local recognition device B includes a segmentation module 104, a feature extraction module 105, a local data set module 106, a local classification model module 107 and a local gesture recognition module 108.

The segmentation module 104 receives the preprocessed data transmitted via the communication module 103 of the signal collection terminal A, and then identifies a beginning point and an ending point of each gesture so as to obtain independent gesture signal segments. The feature extraction module 105 performs feature extraction for each gesture signal segment, and combines the feature data extracted from different gesture signal segments, so as to obtain a multi-dimensional feature vector. That is, gesture data collected from various sensing units are mixed.

The local data set module 106 stores the multi-dimensional feature vector received from the feature extraction module 105, i.e., the gesture data after feature extraction and combination, and uploads the multi-dimensional feature vector to the cloud server C when there is a network connection between the local recognition device B and the cloud server C. The local classification model module 107 establishes local gesture models based on the multi-dimensional feature vector received from the local data set module 106.

The local gesture recognition module 108 performs real-time recognition for the multi-dimensional feature vector received from the local classification model module 107 based on the local gesture models established in the local classification model module 107, so as to obtain a local gesture recognition result. Furthermore, after receiving cloud gesture recognition result from the cloud server C which will be described below, the local gesture recognition module 108 combines the local gesture recognition result and the cloud gesture recognition result, for example through exchange of parameters, to obtain a final gesture recognition result as the recognized gesture of the gesture object. And if no cloud gesture recognition result is received, for example due to no or poor network connection, the local gesture recognition module 108 will regard the local gesture recognition result as the final gesture recognition result.

As shown in FIG. 2, according to an embodiment of the present invention, the cloud server C includes a cloud data set module 109, a cloud classification model module 110 and a cloud gesture recognition module 111. The cloud data set module 109 receives the multi-dimensional feature vectors uploaded from one or more local data set modules 106 of one or more local recognition devices B and forms a massive data set. The cloud classification model module 110 establishes cloud gesture models using the massive data set stored in the cloud data set module 109, and sends the cloud gesture models to the local classification model module 107 of the local recognition device B so as to update the local gesture models with the cloud gesture models.

The cloud gesture recognition module 111 performs recognition for the multi-dimensional feature vector of the local recognition device B received from the cloud classification model module 110 based on the cloud gesture models established in the cloud classification model module 110, so as to obtain the cloud gesture recognition result. Then, the cloud gesture recognition module 111 transmits the cloud gesture recognition result to the local gesture recognition module 108, so that the final gesture recognition result is obtained.

It could be understood since the local recognition device B uploads the multi-dimensional feature vector to the cloud server C and then the cloud server C performs recognition for the multi-dimensional feature vector only when there is a network connection between the local recognition device B and the cloud server C, under the condition that there is no or poor network connection, the local recognition device B will use the local gesture recognition result as the final gesture recognition result, which ensures instant operation of gesture recognition. That is, even if there is no or only poor network connection, the gesture recognition can be still obtained because of the local recognition device B.

Figure 3:
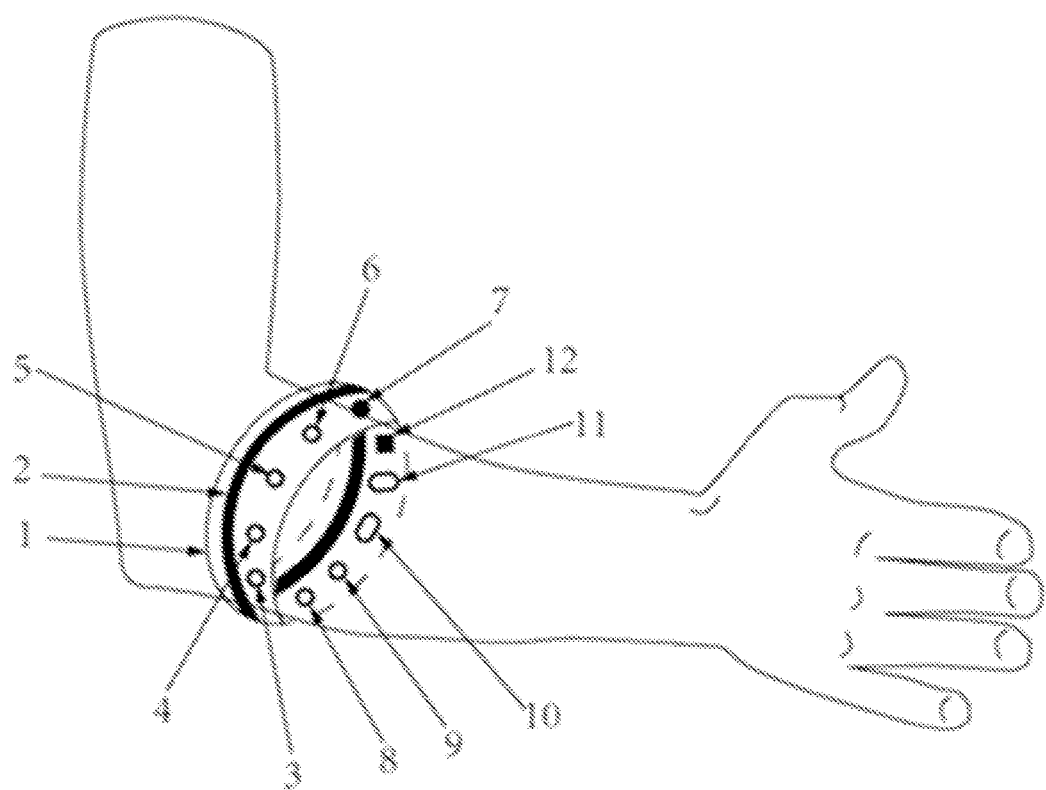
FIG. 3 is a schematic view illustrating a signal collection terminal according to an embodiment of the present invention.

FIG. 3 is a schematic view illustrating a signal collection terminal A according to an embodiment of the present invention.

As shown in FIG. 3, in an embodiment according to the present invention, the signal collection terminal A is a wristband 1 which can be worn on a forearm. The wristband 1 may be formed of soft material, and may have a double-loop design. That is, the wristband 1 includes two parallel annular members, i.e., a first annular member 2 and a second annular member parallel to the first annular member 2. The first annular member 2 is continuous and is used as a reference electrode or a ground electrode. The second annular member includes a plurality of sensing units and a power supply unit. The plurality of sensing units include a plurality of bioelectrical electrodes which are disposed separately and are used to sense bioelectrical signals at different positions on the skin of the forearm, and a plurality of acceleration sensors used to sense space motion signals of a hand.

In an embodiment, six separate bioelectrical electrodes, i.e., a first bioelectrical electrode 3, a second bioelectrical electrode 4, a third biological electrode 5, a fourth biological electrode 6, a fifth bioelectrical electrode 8 and a sixth bioelectrical electrode 9 are disposed and used to sense bioelectrical signals, e.g., myoelectricity and skin impedance, at different positions on the skin of the forearm. It could be understood that the number of bioelectrical electrodes may be varied and the present invention is not limited thereto. In addition, two acceleration sensors, i.e., a first acceleration sensor 10 and a second acceleration sensor 11, are used to sense large-scale space motion signals, e.g., motion acceleration signals and space rotation signals, of hands so as to assist gesture recognition.

In addition, the wristband 1 includes a power supply unit 7, e.g. a battery, used to provide power for the entire signal collection terminal A, and a communication unit 12 used to communicate with the local recognition device B. The communication unit 12 corresponds to the communication module 103 described above, and may communicate with the local recognition device B through Bluetooth protocol.

The communication unit 12 may be disposed on the second angular member, which provides convenience of data transmission.

As known in the art, different sensors have different advantages in description of gesture information. For example, bioelectric electrodes mainly reflect posture of hands and rotation of wrists and are good at identifying fine movements of fingers, while acceleration sensors have good distinguishing ability for gesture with large-scale movements. The gesture recognition system according to embodiments of the present invention includes both of bioelectrical electrodes and acceleration sensors, thus both fine movements of fingers and wrists and large-scale movements of hands and forearms can be identified effectively. That is, the number of actions which can be identified is increased and recognition accuracy is improved.

In addition, the bioelectrical signals and the space motion signals are one-dimensional time-series signals. Compared with image data or video data, the signals according to embodiments of the present invention have less data amount and less power consumption and need less network bandwidths. Thus compared with existing signal collection terminals, the signal collection terminal A according to embodiments of the present invention may be made smaller, thereby having greater portability and applicability.

Figure 4:
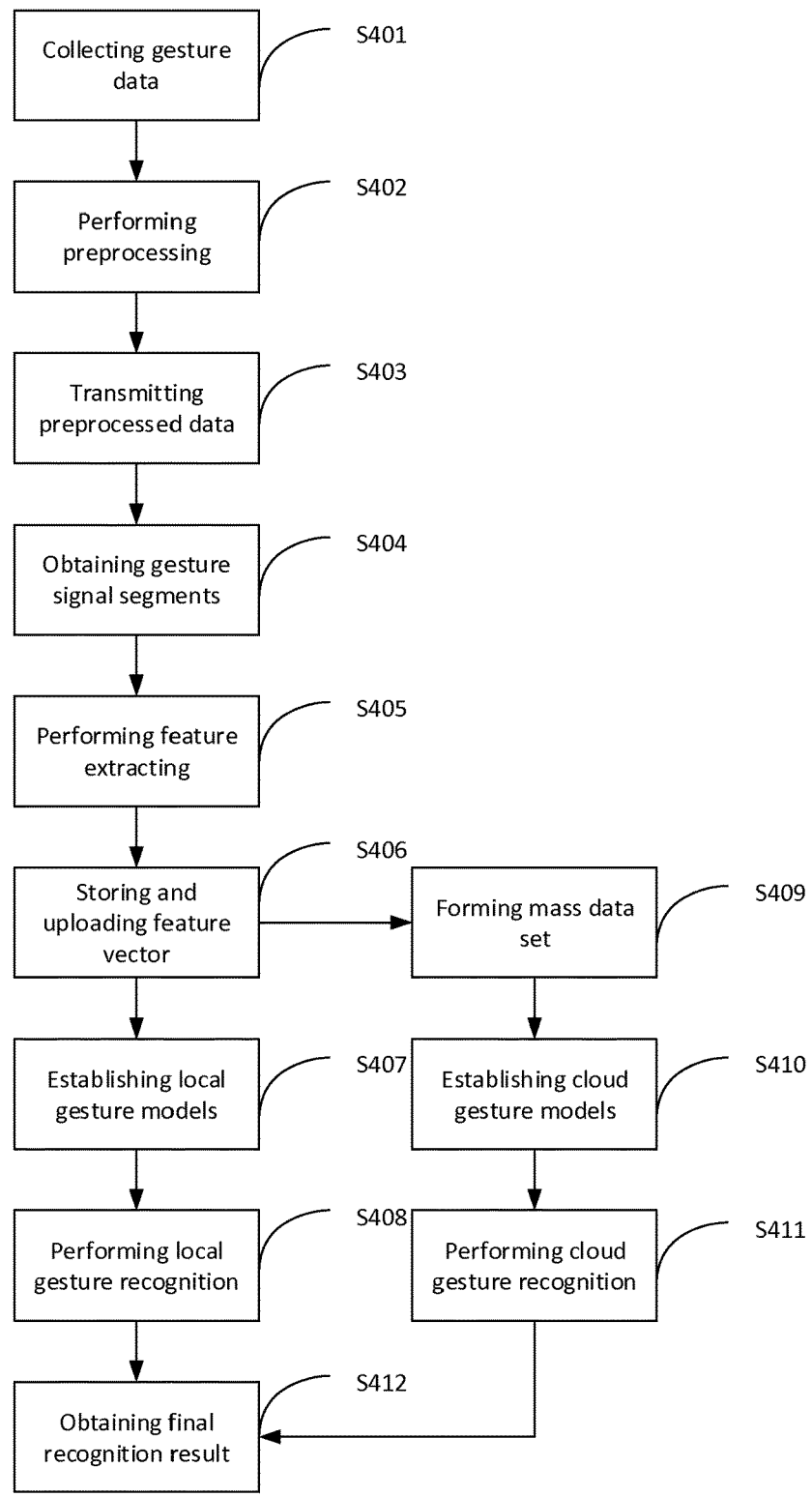
FIG. 4 is a flowchart illustrating a gesture recognition method according to an embodiment of the present invention.

FIG. 4 is a flowchart illustrating a gesture recognition method according to an embodiment of the present invention.

As shown in FIG. 4, at step S401, gesture data of a gesture object is collected. In an embodiment, the gesture data includes bioelectrical signals and space motion signals of a gesture object which are collected by the plurality of bioelectrical electrodes and the plurality of acceleration sensors included in the wristband 1 respectively. The bioelectrical signals may include myoelectricity signals and skin impedance signals, while the space motion signals may include motion acceleration signals and rotation signals for hands.

Next, at step S402, noise reduction preprocessing is performed for the gesture data. For example, ambient noise in the gesture data is removed through a band-pass filter unit or a band-stop filter unit.

At step S403, the preprocessed data is transmitted to the local recognition device B, e.g., the computer B1 or the mobile phone B2, through Bluetooth protocol or other wire or wireless communication.

The steps S401 to S403 may be implemented in the signal connection terminal A, for example may be implemented in the collection module 101, the preprocessing module 102 and the communication module 103 shown in FIG. 2 respectively.

Next, at step S404, a beginning point and an ending point of each gesture is identified from the preprocessed data, so that independent gesture signal segments are obtained. In detail, gesture original signals are obtained by baseline detection, smooth filtering, zero crossing detection and calculation of the area under the waveform curve for the preprocessed data. Then the obtained gesture original signals are normalized so that absolute magnitudes of the gesture original signals are converted to relative magnitudes between 0 and 1. In signals with a continuous time series, the relative amplitudes are compared with predetermined energy thresholds, so that the beginning point and the ending point of each gesture are identified. Thereafter, independent gesture signal segments are obtained based on the beginning point and the ending point of each gesture.

Here, the energy thresholds may be updated once more gesture data is received and processed in the cloud server C. For example, after receiving and processing more gesture data, the cloud server C will calculate new energy thresholds which will be more accurate and send the new energy thresholds to the local recognition device B. Then the current energy thresholds stored in the local recognition device B will be updated with the new energy thresholds.

At step S405, for each gesture signal segment, a set of data, i.e., features, which can represent inherent characteristics of each gesture signal segment are extracted to describe each valid action. The features may be average value of absolute values of signal amplitudes. Then multiple features extracted from different gesture signal segments, such as myoelectricity signals and skin impedance signals sensed by the plurality of bioelectrical electrodes and space motion signals reflecting amplitudes and angles of movements sensed from the acceleration sensors, are combined so that a multi-dimensional feature vector is obtained.

At step S406, the multi-dimensional feature vector is stored. When there is a network connection between the local recognition device B and the cloud server C, the multi-dimensional feature vector is uploaded to the cloud server C, for example to the cloud data set module 109. After completion of uploading, the multi-dimensional feature vector may be deleted to save the local storage resource.

At step S407, local gesture models are established based on the multi-dimensional feature vector. In detail, there are two training modes used to establish the local gesture models: supervised training mode and unsupervised training mode. Under the supervised training mode, a classifier model is trained by labels provided by the user and centralized local data. Under the unsupervised training mode, gesture data of the user is classified into gesture subsets with labels by clustering. Use of both two training modes improves accuracy of the classifier models and thus improves the recognition accuracy of gestures.

At step S408, local gesture recognition is performed for the multi-dimensional feature vector based on the local gesture models, so as to obtain a local gesture recognition result.

The steps S404 to S408 may be implemented in the local recognition device B, for example may be implemented in the segmentation module 104, the feature extraction module 105, the local data set module 106, the local classification model module 107 and the local gesture recognition module 108 shown in FIG. 2 respectively.

Besides the processing implemented in the local recognition device B, gesture recognition may be implemented in the cloud server C also. As shown in FIG. 4, at step S409, a massive data set is formed based on the gesture data, i.e., the multi-dimensional feature vector, uploaded from one or more local recognition devices B.

At step S410, cloud gesture models are established using the massive data set. The cloud gesture models may be trained with the supervised training mode and the unsupervised training mode which are similar to the modes described referring to step S407 and repeated description is omitted herein. With the increase of uploaded data, the models are continuously trained through iteration, so that the models can reflect the common features of different user gestures better, thereby eliminating the impact of individual noise. After completion of each iteration training, the cloud gesture models may be transmitted to the local recognition device B to update the local gesture models of the local recognition device B, so as to improve the local recognition accuracy. In consideration of limitation of local storage resource, the cloud gesture models may be cut properly before being transmitted. That is, a part of the cloud gesture models, rather than the whole cloud gesture models, may be transmitted to the local recognition device B.

At step S411, cloud gesture recognition is performed for the multi-dimensional feature vector based on the cloud gesture models, so as to obtain a cloud gesture recognition result.

The steps S409-S411 may be implemented in the cloud server C, for example may be implemented in the cloud data set module 109, the cloud classification model module 110 and the cloud gesture recognition module 111 shown in FIG. 2 respectively.

Finally, at step S412, a final gesture recognition result is obtained. In detail, if the cloud gesture recognition result is received in time, the final gesture recognition result will be obtained by combining the local gesture recognition result and the cloud gesture recognition result, for example through exchange of parameters. And if no cloud gesture recognition result is received in time, for example due to no or poor network connection, the final gesture recognition result will be obtained by using the local gesture recognition result directly.

The step S412 may be implemented in the local gesture recognition module 108 shown in FIG. 2.

In another embodiment, the local gesture models and the cloud gesture models may be established and trained with some existing methods, for example some intelligent recognition methods such as fuzzy recognition method or neural network pattern method.

With the gesture recognition system and the gesture recognition method according to embodiments of the present invention, the local recognition device receives preprocessed data and performs feature extraction and combination, establishes local gesture models and performs real-time gesture recognition. Meanwhile, when there is a network connection between the local recognition device and the cloud server, the local recognition device transmits the gesture data after extraction and combination to the cloud server. The cloud server establishes cloud gesture models and performs gesture recognition. In addition, the cloud server updates the local gesture models with the cloud gesture models. Thus it could be seen there are both of "local recognition mode" and "cloud recognition mode" in the embodiments of the present invention. When the user is not capable of accessing the Internet due to various limitations, the local recognition device can perform real-time gesture recognition, thereby ensuring that the gesture recognition can be performed at any time and in any environment. And when the user is capable of accessing the Internet, the cloud server establishes cloud gesture models based on gesture data received from multiple local recognition devices and updates the local gesture models with the cloud gesture models, thereby improving accuracy of gesture recognition.

When establishing the local gesture models or the cloud gesture models, both of "supervised training mode" and "unsupervised training mode" can be used. Under the supervised training mode, a classifier model is trained by labels provided by the user and centralized local data. Under the unsupervised training mode, gesture data of the user is classified into gesture subsets with labels by clustering. Thus by using both of two training modes, the accuracy of the classifier models is improved and thus the recognition accuracy of gestures is further improved.

The signal collection terminal according to embodiments of the present invention may be formed as a wristband form, which has simple structure and great portability, so the signal collection terminal is easy to use. In addition, both of bioelectrical electrodes which are good at sensing fine actions of fingers and acceleration sensors which are good at sensing large-scale movement are provided, thus more actions can be sensed, the recognition accuracy of gestures is further improved. In addition, compared with video data, bioelectrical signals and space motion signals have less data size and need less network bandwidth, thus the signal collection terminal according to embodiments of the present invention has less size and less power consumption, and is easier to carry and use, which enhances the user experience.

In addition, the preprocessed data in the signal collection terminal may be transmitted to the local recognition device through a Bluetooth communication module, thereby providing convenient data transmission. Furthermore, after being transmitted to the cloud server, the local gesture data set may be deleted from the local recognition device to save local storage resource, which improves the performance of the gesture cognition system.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A gesture recognition system, comprising:
   a signal collection terminal, configured to collect and preprocess gesture data of a gesture object;
   a local recognition device, configured to extract features from the gesture data received from the signal collection terminal, form a multi-dimensional feature vector based on extracted features, establish local gesture models based on the multi-dimensional feature vector and perform local gesture recognition according to the local gesture models; and
   a cloud server, configured to receive the multi-dimensional feature vector from the local recognition device when there is a network connection between the local recognition device and the cloud server, establish cloud gesture models based on the received multi-dimensional feature vector, and perform cloud gesture recognition according to the cloud gesture models;
   wherein the cloud server is further configured to transmit the cloud gesture models to the local recognition device, and the local recognition device is further configured to update the local gesture models with the cloud gesture models transmitted by the cloud server.

2. The gesture recognition system according to claim 1, wherein the signal collection terminal comprises:
   a collection module, configured to collect the gesture data of the gesture object;
   a preprocessing module, configured to perform noise deduction preprocessing for the gesture data; and
   a communication module, configured to transmit the preprocessed gesture data to the local recognition device.

3. The gesture recognition system according to claim 2, wherein the collection module comprises a plurality of bioelectrical electrodes and a plurality of acceleration sensors, wherein the gesture data includes bioelectrical signals sensed from the plurality of bioelectrical electrodes and space motion signals sensed from the plurality of acceleration sensors.

4. The gesture recognition system according to claim 3, wherein the bioelectrical signals include myoelectricity signals and skin impedance signals, the space motion signals include motion acceleration signals and space rotation signals.

5. The gesture recognition system according to claim 2, wherein the communication module transmits the preprocessed gesture data through a wireless protocol.

6. The gesture recognition system according to claim 2, wherein the preprocessing module comprises a band-pass filter unit and/or a band-stop filter unit.

7. The gesture recognition system according to claim 1, wherein the local recognition device comprises:
 a segmentation module, configured to receive the gesture data from the signal collection terminal, identify a beginning point and an ending point of each gesture so as to obtain independent gesture signal segments;
 a feature extraction module, configured to perform feature extraction for each gesture signal segment, and combine the feature data extracted from different gesture signal segments so as to obtain a multi-dimensional feature vector;
 a local data set module, configured to store the multi-dimensional feature vector and upload the multi-dimensional feature vector to the cloud server when there is a network connection between the local recognition module and the cloud server;
 a local classification model module, configured to establish local gesture models based on the multi-dimensional feature vector and update the local gesture models with the transmitted cloud gesture models; and
 a local gesture recognition module, configured to perform real-time recognition for the multi-dimensional feature vector according to the local gesture models, so as to obtain a local gesture recognition result.

8. The gesture recognition system according to claim 7, wherein the local data set module is further configured to delete the multi-dimensional feature vector after uploading the multi-dimensional feature vector to the cloud server.

9. The gesture recognition system according to claim 7, wherein the segmentation module is configured to obtain gesture original signals by baseline detection, smooth filtering, zero crossing detection and calculation of area under a waveform curve for the preprocessed data, and normalize the obtained gesture original signals, convert absolute magnitudes of the gesture original signals to relative magnitudes between 0 and 1, compare the relative magnitudes with predetermined energy thresholds so as to identify the beginning point and the ending point of each gesture.

10. The gesture recognition system according to claim 9, wherein the segmentation module is further configured to update the energy thresholds with energy threshold sent from the cloud server.

11. The gesture recognition system according to claim 7, wherein the cloud server comprises:
 a cloud data set module, configured to receive the multi-dimensional feature vectors uploaded from one or more local data set modules of one or more local recognition devices, and form a massive data set;
 a cloud classification model module, configured to establish cloud gesture models using the massive data set and transmit the cloud gesture models to the local classification model module; and
 a cloud gesture recognition module, configured to perform recognition for the multi-dimensional feature vector received from the local recognition device according to the cloud gesture models, so as to obtain a cloud gesture recognition result.

12. The gesture recognition system according to claim 11, wherein the cloud classification model module is further configured to cut the cloud gesture models before transmitting the cloud gesture models to the local classification model module.

13. The gesture recognition system according to claim 11, wherein the local gesture recognition module is further configured to receive the cloud gesture recognition result from the cloud gesture recognition module, and obtain a final gesture recognition result based on combination of the local gesture recognition result and the cloud gesture recognition result.

14. The gesture recognition system according to claim 1, wherein the signal collection terminal is a wristband, wherein the wristband comprises two parallel annular members, the first annular member is continuous and is used as a reference electrode, the second annular member includes a plurality of sensing units and a power supply unit.

15. The gesture recognition system according to claim 14, wherein the plurality of sensing units comprise a plurality of bioelectrical electrodes configured to sense bioelectrical signals at different positions on skin of a forearm and a plurality of acceleration sensor configured to sense space motion signals of a hand.

16. A gesture recognition method, comprising:
 collecting and preprocessing gesture data of a gesture object;
 extracting features from the gesture data and forming a multi-dimensional feature vector based on extracted features;
 establishing local gesture models based on the multi-dimensional feature vector and performing local gesture recognition according to the local gesture models;
 establishing a cloud gesture models based on the multi-dimensional feature vector and performing cloud gesture recognition according to the cloud gesture models when there is a network connection; and
 updating the local gesture models with the cloud gesture models.

17. The gesture recognition method according to claim 16, further comprising obtaining a final gesture recognition result based on combination of the result of the step of performing local gesture recognition and result of the step of performing cloud gesture recognition when there is the network connection.

18. The gesture recognition method according to claim 16, wherein the gesture data includes bioelectrical signals and space motion signals.

* * * * *